United States Patent [19]

Holland

[11] 4,335,681
[45] Jun. 22, 1982

[54] MANURE SHIELD FOR MULTI-TIER POULTRY CAGE CONSTRUCTIONS

[75] Inventor: Eddie L. Holland, Cumming, Ga.

[73] Assignee: U.S. Industries, Inc., New York, N.Y.

[21] Appl. No.: 226,402

[22] Filed: Jan. 19, 1981

[51] Int. Cl.³ .................. A01K 31/04; A01K 31/06
[52] U.S. Cl. .................................. 119/17; 119/22; 119/48
[58] Field of Search .................. 119/17, 18, 21, 22, 119/48

[56] References Cited

U.S. PATENT DOCUMENTS 3,768,442 0/1973 Van Huis.
4,212,269 7/1980 White et al. ...................... 119/17

FOREIGN PATENT DOCUMENTS 2752825 5/1979 Fed. Rep. of Germany ........ 119/48

OTHER PUBLICATIONS

Brochure entitled "Profit-Tier Reverse Cage System," SL-179-65, by Big Dutchman.

Primary Examiner—Hugh R. Chamblee
Attorney, Agent, or Firm—Price, Heneveld, Huizenga & Cooper

[57] ABSTRACT

A manure shield is provided for multi-tier poultry cages, and the like, wherein the lower tiers of cages have an exposed area positioned directly below the adjacent upper cage tier. The shield comprises a substantially continuous, rigid support panel, having its lower edge attached to the uppermost edge of one of the lower cage tiers, and extends upwardly and laterally therefrom at an acute angle to a position adjacent the bottom of the upper cage tier. A sheet of flexible, substantially imperforate material is positioned over the upper side of the support panel to prevent manure droppings from entering the lower tier of cages. The flexible sheet is mounted over the support panel, such that vibrations and other movements in the cages are transmitted by the support panel to the flexible sheet, whereby manure droppings stuck to the flexible sheet are disjoined therefrom by the vibrations, and in turn slide off of the shield into a collection pit.

23 Claims, 7 Drawing Figures

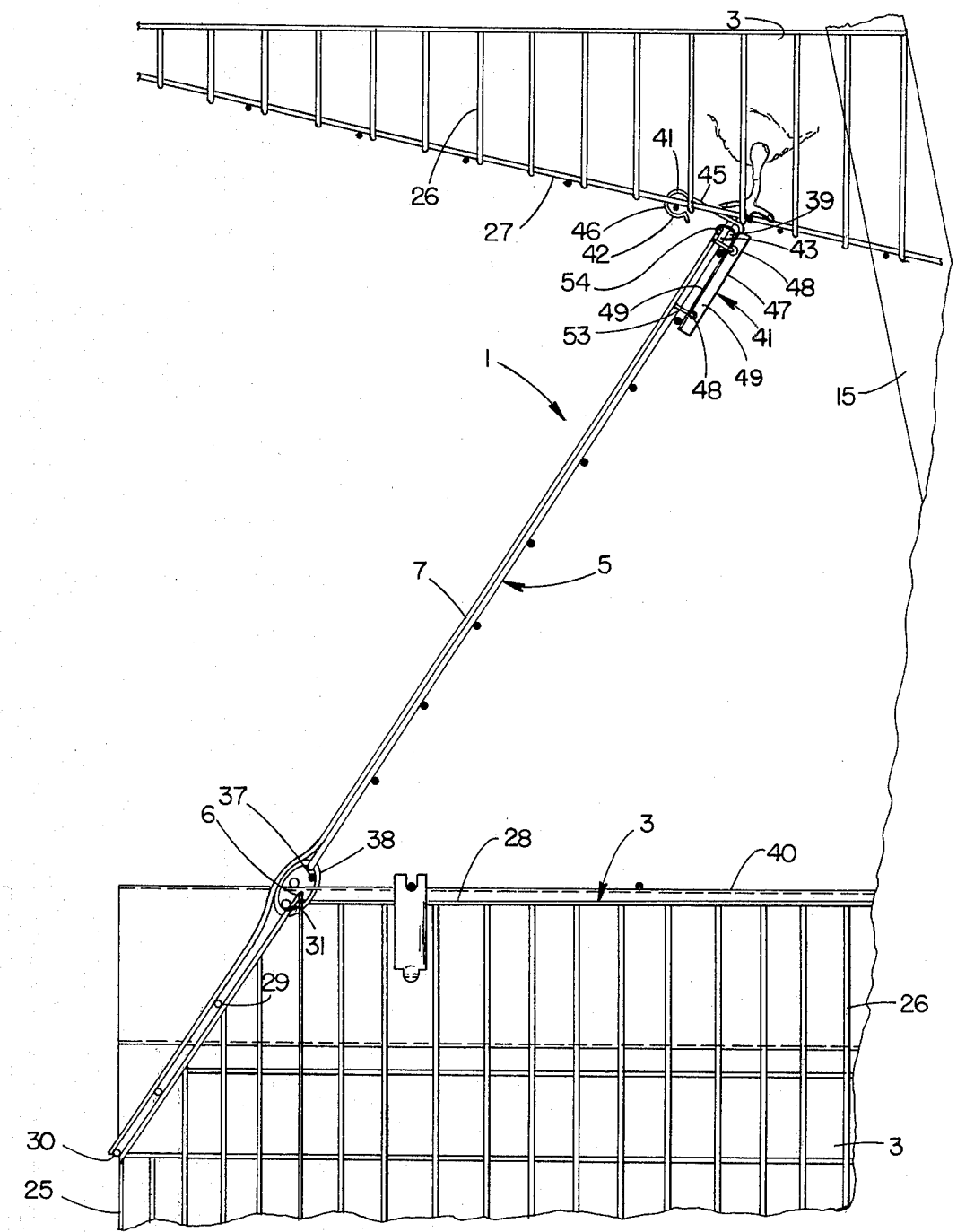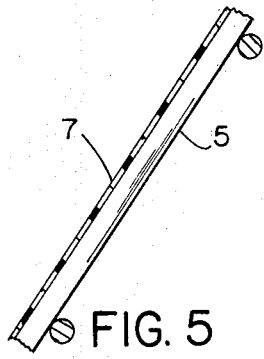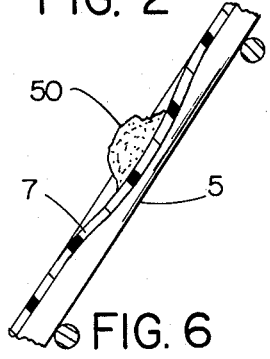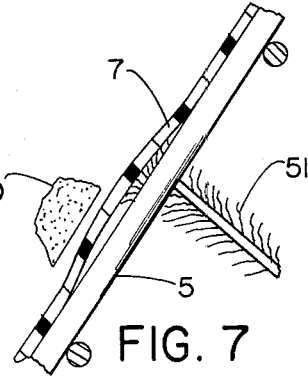
FIG. 2
FIG. 5   FIG. 6   FIG. 7

MANURE SHIELD FOR MULTI-TIER POULTRY CAGE CONSTRUCTIONS

BACKGROUND OF THE INVENTION

The present invention relates to multi-deck cage constructions for poultry and the like, and in particular to a manure shield therefor.

Multi-tier cage constructions, such as that disclosed in U.S. Pat. No. 3,768,442 to Van Huis have become the predominant system in the United States for raising poultry, and other similar livestock. In such systems, the confinement cages are arranged in at least two tiers or levels of longitudinally extending rows. The cages in each row are positioned side-by-side, and the rows are typically arranged in pairs, with a manure collection pit disposed therebetween, extending along the backs of the cages. In order to reduce the building space required to house or shelter such cage units, the rows of cages are arranged in a partially offset, pyramidal configuration. In this cage arrangement, the interior sides of the lower cage rows are disposed directly below a portion of the upper cage rows, such that the birds in the lower cages are exposed to manure droppings from the birds in the upper cage tiers.

Heretofore, various shield arrangements have been proposed to prevent manure droppings from entering the lower cages of multi-tier systems. Such shields include rigid collection plates disposed between the cage tiers, with a mechanical scraper assembly, which periodically removes the manure from the plates, and deposits it in a collection pit. Such an arrangement is disclosed in the aforementioned Van Huis patent. However, these mechanical scraper systems are relatively complex, expensive, and require periodic maintenance, which is often quite inconvenient and time consuming.

Another shield arrangment for multi-tier cage constructions is presently manufactured by Diamond, and comprises a sheet of rigid plastic which is hung from the bottom of the upper cage tiers, and covers the exposed areas of the lower tier of cages. The rigid plastic panel is relatively smooth, and disposed at a sufficient angle that it is designed to direct impinging manure droppings into the collection pit without the assistance of a mechanical scraper mechanism. However, under most circumstances, the poultry manure tends to stick to the shield, and forms a thick cake or layer which must be manually removed.

Yet another shield arrangement for multi-tier cage systems is presently manufactured by Northco, and comprises draping a lightweight sheet of fabric from the upper tier of cages, over the exposed area of the lower cage tiers, at a relatively steep angle. In this shield arrangement, the poultry droppings stick to the fabric, and because it is not supported from the back, cause the fabric panel to sag, or even rip, so that the manure is not deflected into the collection pit. Like the rigid plastic shields described above, the fabric shields become caked, and must be manually scraped or replaced.

In addition to the above described shield systems, another arrangement for handling manure droppings in multitier cage systems is disclosed in the Big Dutchman brochure entitled "PROFIT-TIER REVERSE CAGE SYSTEM," as noted in the attached Disclosure Statement. In this system, the depth of the cages (approximately 14 inches) is substantially smaller than prior cages (approximately 20 inches), and the cages are arranged in four closely spaced vertical tiers. The cage rows are tilted upwardly, such that the only exposed area of the lower tier cages is the steeply inclined rear wall, which is covered with a sheet of polyethylene, whereby manure droppings are shaken loose from the sheet by movement of the cage to which it is attached. Although this type of four-tier cage construction does alleviate the manure handling problems experienced by prior art systems, the modified cage shape, size and inclined orientation of the cages has proven to be less efficient than the standard, three-tier horizontal cage arrangement, thereby increasing the overall cost per bird of the cage construction.

SUMMARY OF THE INVENTION

One aspect of the present invention is to provide an effective manure shield for multi-tier poultry cage constructions, and the like. The shield comprises a substantially continuous, rigid support panel having a lower edge connected with an uppermost edge of a lower cage tier, and extends upwardly and laterally therefrom at an acute angle to a point vertically aligned with the front boundary of that area of the cages exposed directly beneath the upper adjacent tier of cages. A sheet of flexible, substantially imperforate material is positioned over the upper side of the support panel, and extends over the first tier of cages to the rear boundary of the exposed cage area, to prevent manure droppings from entering the lower tier of cages. The flexible sheet is mounted overlying the support panel, such that the support panel transmits vibrations from the first tier of cages to the flexible sheet, whereby manure droppings stuck to the flexible sheet are disjoined therefrom by the vibrations, and in turn slide off of the shield into a manure collection pit. Preferably, the support panel is perforate, so as to permit the tail feathers of the poultry retained in the cages to project therethrough and impinge upon the flexible sheet to locally, elastically deform the same, thereby further dislodging manure stuck to the sheet. In the illustrated embodiment, ring fasteners attach the flexible sheet to the support, and the shield assembly is pivotally suspended from an upper tier of cages by hinge-like clips. The shield is particularly adapted for use in conjunction with conventional, three-tier cage constructions with an offset, pyramidal arrangement, wherein the cages are oriented substantially horizontally, and the shields extend therefrom at an angle of approximately 60°.

The principal objects of the present invention are to provide a relatively inexpensive manure shield for multi-tier cage constructions which does not require a mechanical scraper assembly. A perforate support panel and flexible overlying sheet provide a shield which will not cake during use, thereby eliminating manual scraping and/or frequent replacement. The shield is quite lightweight, and the vibration of the cages, as well as contact with the birds, causes wrinkling and local elastic deformation of the flexible sheet to continuously clean dried manure from the shield. The shield is quite economical to manufacture, easy to install, capable of a long operating life, and particularly well adapted for use with even low profile multi-tier cage constructions.

These and other features, advantages and objects of the present invention will be further understood and appreciated by those skilled in the art by reference to the following written specification, claims and appended drawings.

BRIEF DESCRIPTION OF THE DRAWINGS

FIG. 2 is an enlarged, fragmentary, end elevational view of the shield, shown connected between two adjacent rows of cages.

FIG. 5 is an enlarged, fragmentary, vertical cross-sectional view of the shield, shown in a clean condition.

FIG. 6 is an enlarged, fragmentary, vertical cross-sectional view of the shield shown in FIG. 5, with a manure dropping thereon.

FIG. 7 is an enlarged, fragmentary, vertical cross-sectional view of the shield illustrated in FIGS. 5 and 6, shown with a poultry feature impinging upon the lower surface of the flexible sheet, thereby disjoining the manure dropping from the shield.

DETAILED DESCRIPTION OF THE PREFERRED EMBODIMENTS

Figure 1:
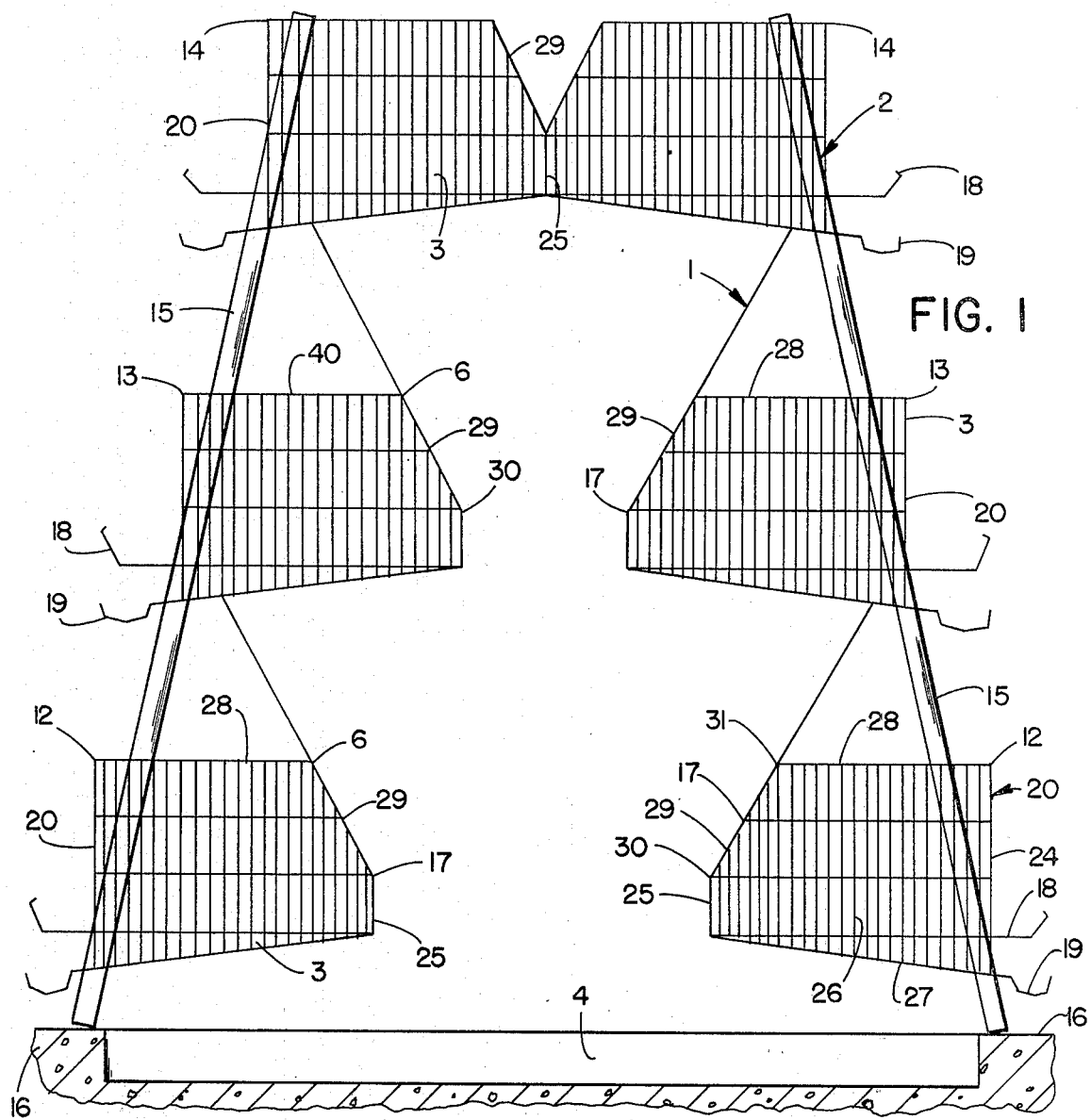
FIG. 1 is a partially schematic, end elevational view of a multi-tier cage construction, having manure shields embodying the present invention attached thereto.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary.

Figure 3:
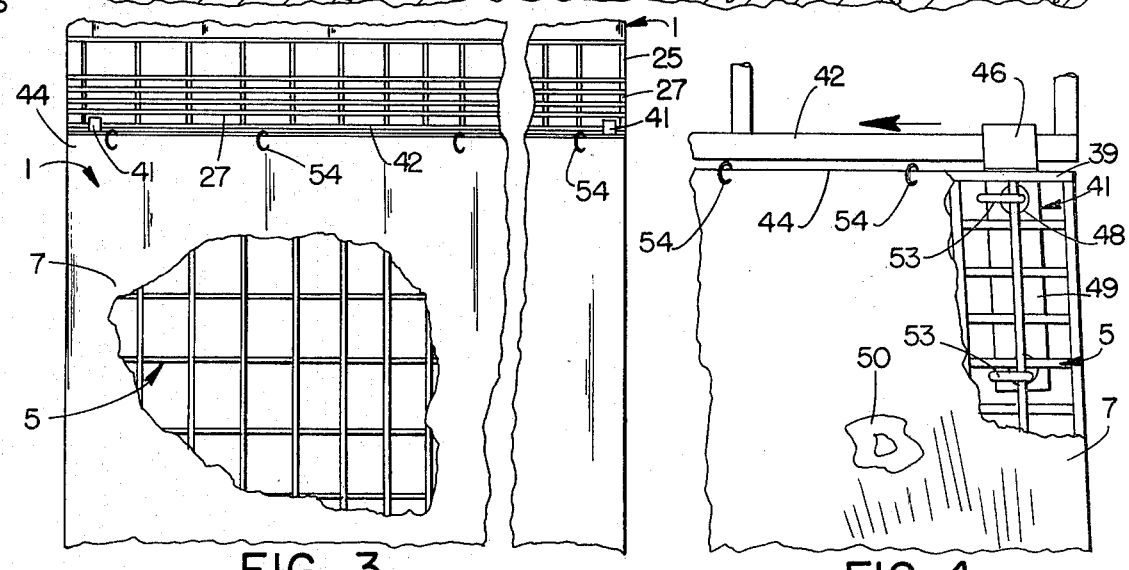
FIG. 3 is a fragmentary, front elevational view of the manure shield, shown attached along the rearward side of a row of cages, and with a portion broken away to reveal internal construction.

The reference numeral 1 (FIG. 1) generally designates a manure shield for a multi-tier poultry cage construction, such as the illustrated three-tier system 2. Cage construction 2 has an offset, pyramidal arrangement of cages 3, with a central manure collection pit 4, wherein the lower tiers of cages have an area which is disposed directly below the adjacent upper cage tier. Shield 1 comprises a rigid, substantially continuous support panel 5 (FIG. 3) having its lower edge attached to the uppermost edge 6 of the lower tier of cages, and extending upwardly therefrom at an acute angle to a point adjacent the bottom of the upper cage tier. A sheet of flexible, substantially imperforate material 7 is positioned over the upper side of support panel 5 to prevent manure droppings from entering the lower tier of cages. Flexible sheet 7 is connected with support panel 5 along the upper edge thereof, such that vibrations and other movement in the lower tier of cages is transmitted to the shield. Manure droppings stuck to flexible shield 7 are disjoined therefrom by the vibrations, and in turn slide off of the shield into collection pit 4.

Manure shield 1 is particularly adapted for use in connection with that type of multi-tier confinement cage system wherein the cages are relatively deep, and/or have a relatively large non-inclined area of the lower tier cages disposed directly below the uper tier cages. In this example, the illustrated cage construction 2 is a three-tier system having a partially offset, pyramidal cage arrangement with three pairs of cage rows 12–14 disposed on opposite sides of the structure at lower, intermediate, and uppermost portions thereof respectively. The cages are mounted on inclined frame members 15, which are in turn supported on a fixed slab 16 in which pit 4 is centrally located, and extends longitudinally along the structure. The cages on the opposite sides of the structure are oriented with their rear sides 17 facing each other, toward the interior of the confinement structure, and each tier or row of cages has a feed conveyor 18 and an egg conveyor 19 extending along the forward side 20 of the cages at the base thereof.

Cages 3 (FIG. 1) are constructed from welded wire mesh, or other similar perforate material, and include vertically disposed front, rear and side panels 24–26 respectively, an inclined base panel 27 which causes the eggs to roll into conveyor 19, and a substantially horizontal top panel 28. The illustrated cages are relatively deep, in the nature of 20 inches between the front and rear panels 24 and 25 respectively. The rear side 17 of the cages includes vertical panel 25, and an inclined section 29 which angles from the upper edge 30 of panel 25 to the rear edge 31 of top panel 28. In this example, panel 29 is inclined at an angle in the nature of 60°, and extends along approximately two-thirds of the cage height. Cages 3 are mounted on the frame members 15 in a substantially horizontal orientation, whereby front and rear panels 20 and 17 are vertical, and top panel 28 is horizontal.

Support panel 5 (FIG. 3) is perforate, having apertures of sufficient size to permit the feathers of poultry retained in the cages to project therethrough and impinge upon flexible sheet 7. The support panel apertures are sized and spaced so as to prevent any substantial localized sagging of flexible sheet 7 in the unsupported areas. In this example, support panel 5 is constructed of welded wire mesh, which is substantially identical to the material from which the cage panels 24–28 are constructed, and has an aperture size of approximately 2 by 4 inches. Support panel 5 extends continuously between the upper and lower cage tiers, and has a substantially rectangular configuration. As best illustrated in FIG. 2, support panel 3 has a lower edge 37, which is attached to the uppermost edge 6 of cage 3, which in this example is the rear edge of top cage panel 28. Support panel 5 extends upwardly and laterally from edge 6 at an acute angle to a point disposed in substantial vertical alignment with the front boundary of the exposed cage area. In the illustrated embodiment, the upper edge of support panel 5 is adjacent the bottom of the upper tier of cages. The angle of inclination of support panel 5 is preferably in the range of 58°–62° to insure that the manure, once dried and dislodged from flexible sheet 7, will slide or fall along the flexible sheet under gravitational forces, into pit 14, without becoming stuck or otherwise coming to rest on the shield. Also, the support panel angle and the inclination of cage panel 29 are preferably commensurate, to form a substantially flat, uninterrupted shield surface.

Support panel 5 is attached to cage 3 in a manner which transmits vibration from the tier of cages to which the support panel is attached to overlying flexible sheet 7 for disjoined manure droppings which impinge upon and stick to the flexible sheet. In this example, the lower edge 37 of support panel 5 is pivotally attached to cage edge 6 by ring fasteners 38, which are spaced regularly along the lower edge of the shield. The upper edge 39 of support panel 5 is substantially aligned with an outer or front boundary line 40 on lower cage 3, which defines that portion of the cage disposed directly below the upper tier cage, and exposed to manure droppings therefrom. The interior or rear boundary line of the exposed cage area is panel edge 30. Hence, in this example, the exposed area of any one cage 3 includes the interior half of upper cage panel 28, and the entire inclined cage panel 29. The upper edge 39 of illustrated support panel 5 is pivotally attached to the lower panel 27 of the upper tier cages along wire 42 by hinge-like clips or hangers 41 spaced along the length thereof, such that vibrations in the upper cages, caused by movement of the poultry, and the like, are transmitted to support panel 5 to further facilitate dislodging manure droppings from the shield. Ring fasteners 38 and hangers 41 permit support panel 5 to move slightly in the vertical, lateral and longitudinal directions, to take full advantage of cage vibrations, and transmit the same to flexible sheet 7. Relative movement between support panel 5 and flexible sheet 7 produces a raking-like action on the interior side of the sheet which deforms the sheet. The non-planar wires of the illustrated mesh are particularly adapted to create this rippling type of deformation in sheet 7 when support panel 5 is vibrated or otherwise jostled.

The illustrated hangers 41 are generally L-shaped in side elevation (FIG. 2), are rigid, and have an upper leg 45 with a hook-shaped clip 46 at the free end thereof which is oriented downwardly and to the right (as viewed in FIG. 2). Clip 46 has a shape adapted to snap over cage wire 42 to pivotally suspend the upper end of shield 1 from the upper tier of cages. The eye of clip end 46 is substantially larger than the diameter of cage wire 42, so that manure shield 1 can readily move vertically, laterally, and longitudinally with respect to the upper tier of cages. The lower leg 47 of each hanger 41 has an L-shaped transverse cross section with two pairs of spaced apart apertures 48 through the two flanges 49. Hanger leg 47 is positioned adjacent the bottom side of support panel 5, and is attached thereto by ring fasteners 53. When fully assembled, the upper leg 45 of hanger 41 is disposed generally perpendicular with the plane of support panel 5, and preferably retains panel 5 sufficiently close to the bottom of the upper cages, so that the feet of the birds randomly contact the upper edge of the shield and impart additional jostling motion to the shield. Hangers 41 are disposed along the upper edge of the shield in a spaced apart fashion at intervals in the nature of 16-24 inches.

Flexible sheet 7 (FIG. 2) is substantially imperforate, positioned over the exterior side of support panel 5, and extends over the inclined panel 29 of cage 3 to the rear side boundary 30 of the exposed cage area to prevent manure droppings from entering the lower tier cages. In this example, flexible sheet 7 is constructed from a polyethylene film, having a thickness in the range of 5 to 15 mills. The exterior side of sheet 7 is smooth, and may be treated with an ultraviolet inhibitor, or other slicking agent. The presently preferred slicking is known in the trade as Hi-Slip Additive. Flexible sheet 7 is preferably supported in a suspended fashion from its upper edge 44, and is otherwise unattached to either support panel 5 or cage 3, such that vibrations in the cages will cause flexible sheet 7 to wrinkle, and thereby dislodge the dried manure adhered thereto. In this example, the flexible sheet upper edge 44 is attached to the uppermost transverse wire 43 of support panel 5 by ring fasteners 54, spaced apart a distance in the nature of 4 inches. Ring fasteners 54 permit flexible sheet 7 to move slightly with respect to support panel 5 during use. Eyelets (not shown) may be provided in flexible sheet 7 to prevent the sheet from ripping.

In operation, manure shield 1 is easily attached to cage construction 2. Hangers 41 are attached to support panel 5 along its upper edge by ring fasteners 53. Flexible sheet 7 is then positioned over support panel 5, and the upper edge 44 of sheet 7 is attached to the upper wire of panel 5 by ring fasteners 54. Next, the lower edge 37 of support panel 5 is connected to the rear edge 6 of the cage top panels 28 in the lower tiers by ring fasteners 38. A shield 1 is installed for each of the lower and intermediate cage rows 12 and 13. Shields 1 are raised to an angle in tha nature of 60°, so that the uppermost edge 39 thereof is disposed substantially in line along a vertical plane with the front boundary 40 of the exposed area of the lower cages, whereby manure droppings from the upper tier cages will land on the shield. The upper legs 45 of hangers 41 are inserted through the wire fabric of cage bottom 27, and the shield is then rotated slightly downwardly until clips 46 snap over cage wire 42. Hangers 41 provide quick, secure and easy installation of the manure shield.

Figure 4:
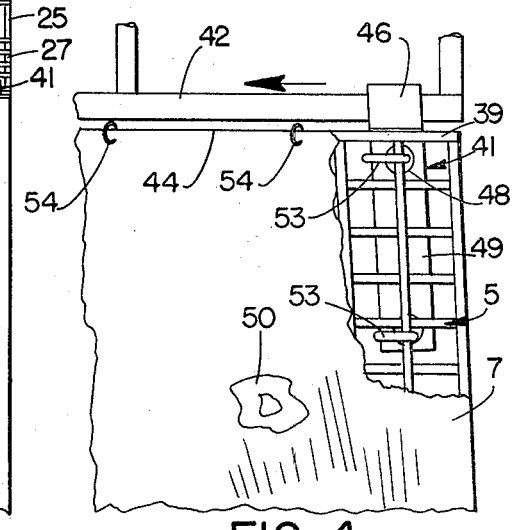
FIG. 4 is an enlarged, fragmentary, front elevational view of the shield, with a portion broken away, and a manure dropping stuck thereon, and wrinkles formed in a flexible sheet portion of the shield by relative movement of the cage.

When the shield is clean, as shown in FIG. 5, flexible sheet 7 lies flat over the exterior surface of support panel 5. During use, manure droppings 50 from the birds or other livestock in the upper and intermediate cage rows 13 and 14 land on the shield disposed directly thereunder. Depending upon the diet of the birds, the manure will either deflect off of the shield 1, or stick to it, as shown in FIG. 6. With respect to the more viscous manure droppings which impinge upon flexible sheet 7 and adhere thereto, these droppings will dry within several hours and become rather brittle. The mesh of support panel 5 and inclined cage panel 29 is sufficiently close to prevent any substantial localized sagging of flexible sheet 7 under the weight of the manure droppings, even when the droppings are positioned over the center of a support panel aperture. Some localized sagging does occur, as shown in FIG. 6, and is beneficial to the rippling action of the sheet 7. However, panel 5 prevents any substantialized sagging which would result in an angle of repose that would not cause the droppings to fall off of the shield once unstuck from sheet 7. The movement of the birds in the cage rows on either side of the shield causes a vibration or jostling motion which is transmitted to support panel 5 through hangers 41 and thence to sheet 7 through ring fasteners 54. This motion creates small wrinkles in flexible sheet 7, as illustrated in FIG. 4, which tends to disjoin or unstick the dried manure 50 from the exterior surface of the flexible sheet. In addition to these vibratory motions, the feathers of the birds retained in the cages stick through the mesh, and impinge upon the interior surface of flexible sheet 7, as best illustrated in FIGS. 5-7. The tail feathers 51 of the birds contact that portion of flexible sheet 7 disposed over inclined panel 29, as well as the lower part of support panel 5. The contact of the poultry feathers on flexible sheet 7 locally and elastically deforms the same, which also serves to dislodge manure 50 stuck to flexible sheet 7. A jostling motion is also applied to the upper end of support panel 5 when the feet of birds in the upper cages abut the upper edge of the shield, as illustrated in FIG. 2. This contributes relative motion between support panel 5 and flexible sheet 7 which produces a raking action on sheet 7. The combination of localized deformation of sheet 7 by bird tail feathers, contact between the feet of the birds and the upper edge of the shield, and the vibratory motion imparted to the shield by the cages on the upper and lower sides of the shield continuously cleans the manure from the shield. The dislodged manure 50 falls or slides along the inclined shield under gravitational forces, and is deposited into collection pit 4, which is periodically cleaned by conventional means.

The perforated support panel 5 and overlying flexible sheet 7 provide an effective, inexpensive manure shield which does not require a mechanical scraper assembly, but continuously cleans itself through the vibratory motions of the cages, as well as contact between the birds with the flexible sheet and support panel 5. The shield is very lightweight, whereby additional support framework is not required for the cage construction, and is relatively inexpensive to manufacture, and easy to install. The attachment of flexible sheet 7 and support panel 5 with the cages is not only extremely efficient and economical, but also produces a wrinkling or crinkling effect in flexible sheet 7 upon vibration of the cages, which is particularly adapted to dislodge manure droppings adhered to flexible sheet 7. The manure shield is capable of remaining quite clean without manual scraping, and is particularly effected for low profile, three-tier cage systems.

In the foregoing, description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a multi-tier cage construction for poultry and the like, having a first tier of cages, and a second tier of cages positioned thereabove; each tier of cages having top, bottom, front and back panels; and said first tier of cages having an exposed area positioned directly below said second tier of cages, wherein said exposed area is defined by front and rear boundaries, the improvement of a manure shield, comprising:
    a substantially continuous, rigid support panel having a lower edge thereof connected with a rear edge of the top panel of said first tier cages, said support panel extending upwardly and laterally from said top panel rear edge at an acute angle to a point disposed substantially aligned along a vertical plane with the front boundary of said exposed cage area;
    a sheet of flexible, substantially imperforate material positioned over the upper side of said support panel, and extending to the rear boundary of said exposed cage area to prevent manure droppings from entering said first tier cages; and
    means for mounting said flexible sheet over said support panel, whereby said support panel transmits vibrations from said first tier of cages to said flexible sheet, and manure droppings stuck to said flexible sheet are disjoined therefrom by the vibrations, and in turn slide off of said shield.

2. A cage construction as set forth in claim 1, wherein:
    said mounting means extends along a top edge of said flexible sheet, and suspends said sheet therefrom over the upper side of said support panel.

3. A cage construction as set forth in claim 2, wherein:
    said sheet is otherwise unattached to said support panel and said first tier cages.

4. A cage construction as set forth in claim 1, wherein:
    said support panel comprises a sheet of mesh.

5. A cage construction as set forth in claim 1, including:
    means for connecting an upper edge of said support panel to said second tier of cages, whereby vibrations from both cage tiers are transmitted to said shield.

6. A cage construction as set forth in claim 1, wherein:
    said support panel is perforate, having apertures of sufficient size to permit feathers of poultry retained in said cages to project therethrough and impinge upon said flexible sheet for locally, elastically deforming the same, and thereby dislodging manure stuck to said flexible sheet.

7. A cage construction as set forth in claim 6, wherein:
    said support panel comprises a sheet of welded wire mesh.

8. A cage construction as set forth in claim 7, wherein:
    said mesh panel lower edge is pivotally connected with said first tier cages by ring fasteners; and
    said mesh panel includes an upper edge pivotally connected with said second level cages by hangers.

9. A cage construction as set forth in claim 1, wherein:
    said flexible sheet is constructed of polyethylene film having a thickness in the range of 5–15 mills.

10. A cage construction as set forth in claim 1, wherein:
    said acute angle is substantially 60°.

11. A cage construction as set forth in claim 1, wherein:
    said mounting means extends along a top edge of said flexible sheet, and suspends said sheet therefrom over the upper side of said support panel;
    said sheet is otherwise unattached to said support panel and said first tier cages; and
    said support panel is perforate, having apertures of sufficient size to permit the feathers of poultry retained in said cages to project therethrough and impinge upon said flexible sheet for locally, elastically deforming the same, and thereby dislodging manure stuck to said sheet.

12. A cage construction as set forth in claim 11, wherein:
    said cage construction comprises an offset, pyramidal cage arrangement with a centrally disposed collection pit, disposed below the lower edge of said shield and into which the manure droppings are deposited.

13. In a multi-tier cage construction for poultry and the like, having a pyramidal, offset cage arrangement, including a first tier of cages, a second tier of cages positioned generally thereabove and a manure collection pit disposed generally below said cages; said first tier of cages having an exposed area positioned directly below said second tier of cages, wherein said exposed area is defined by front and rear boundaries, the improvement of a manure shield, comprising:
    a substantially continuous, rigid support panel having a lower edge thereof connected with an uppermost edge of said first tier cages, and extending upwardly and laterally therefrom at an acute angle to a point disposed substantially aligned along a vertical plane with the front boundary of said exposed cage area; and a sheet of flexible, substantially imperforate material positioned over the upper side of said support panel, and extending over the first tier cages to the rear side boundary of said exposed cage area to prevent manure droppings from entering said first tier cages;

means for mounting said flexible sheet over said support panel, whereby said support panel transmits vibrations from said first tier cages to said flexible sheet, and manure droppings stuck to said flexible sheet are disjoined therefrom by the vibrations, and in turn slide off of said shield into said manure collection pit.

14. A cage construction as set forth in claim 13, wherein:

said mounting means extends along a top edge of said flexible sheet, and suspends said sheet therefrom over the upper side of said support panel;

said flexible sheet is otherwise unattached to said support panel and said first tier cages; and said support panel is perforate, having apertures of sufficient size to permit feathers of poultry retained in said cages to project therethrough and impinge upon said flexible sheet for locally, elastically deforming the same, and thereby dislodging manure stuck to said sheet.

15. A cage construction as set forth in claim 14, including:

hangers pivotally connecting an upper edge of said support panel to said second tier cages, whereby vibration from the cages of both tiers is transmitted to said shield.

16. A cage construction as set forth in claim 15, wherein:

said sheet mounting means comprises ring fasteners which permit relative motion between said flexible sheet and said support panel.

17. A cage construction as set forth in claim 16, wherein:

said support panel has an upper edge disposed sufficiently close to the base of said second tier of cages that the feet of the poultry disposed in said second tier of cage randomly contact the upper edge of said shield, thereby imparting additional motion to said shield for the removal of manure stuck to said shield.

18. A manure shield for multi-tier cages for poultry and the like, having a pyramidal, offset cage arrangement, including a first tier of cages, a second tier of cages positioned generally thereabove, and a manure collection pit disposed generally below said cages; said first tier of cages having an exposed area positioned directly below said second tier of cages, and wherein said exposed area is defined by rear and front boundaries, said manure shield comprising:

a substantially continuous, rigid support panel having a lower edge thereof adapted for connection with an uppermost edge of said first tier of cages, and shaped to extend upwardly and laterally therefrom at an acute angle to a point disposed substantially aligned along a vertical plane with the front boundary of said exposed cage area;

a sheet of flexible, substantially imperforate material positioned over the upper edge of said support panel, and adapted to extend over the first tier cages to the rear boundary of the exposed cage area to prevent manure droppings from entering said first tier cages; and means for connecting said flexible sheet with said support panel and adapted to transmit vibrations from said first tier cages to said flexible sheet, whereby manure droppings stuck to said flexible sheet are disjoined therefrom by the vibrations, and in turn slide off of said shield into the manure collection pit.

19. A manure shield as set forth in claim 18, wherein: said connecting means extends along a top edge of said flexible sheet, and suspends said sheet therefrom over the upper side of said support panel.

20. A manure shield as set forth in claim 19, including: means for connecting an upper edge of said support panel to said second level of cages, whereby vibrations from both cage levels are transmitted to said shield.

21. A manure shield as set forth in claim 20, wherein: said support panel comprises a sheet of wire mesh, having apertures of sufficient size to permit the tail feathers of poultry retained in said cages to project therethrough and impinge upon said flexible sheet for locally elastically deforming the same, and thereby dislodging manure stuck to said flexible sheet.

22. A manure shield as set forth in claim 20, wherein: said flexible sheet is constructed of polyethylene film having a thickness in the range of 5–15 mills.

23. A manure shield as set forth in claim 22, wherein: said acute angle is substantially 60 degrees.

* * * * *

UNITED STATES PATENT AND TRADEMARK OFFICE
CERTIFICATE OF CORRECTION

PATENT NO. : 4,335,681
DATED : June 22, 1982
INVENTOR(S) : Eddie L. Holland

It is certified that error appears in the above—identified patent and that said Letters Patent is hereby corrected as shown below:

Column 3, line 25

"feature" should be --feather--

Column 3, line 64

"uper" should be --upper--

Column 6, line 13

"tha" should be --the--

Column 7, line 24

"effected" should be --effective--

Column 9, line 49, claim 17

"cage" should be --cages--

Column 10, line 18, claim 18

"edge" should be --side--

Signed and Sealed this

Twenty-sixth Day of October 1982

[SEAL]

Attest:

GERALD J. MOSSINGHOFF

Attesting Officer    Commissioner of Patents and Trademarks